(12) United States Patent
Chao et al.

(10) Patent No.: US 8,553,537 B2
(45) Date of Patent: Oct. 8, 2013

(54) SESSION-LESS LOAD BALANCING OF CLIENT TRAFFIC ACROSS SERVERS IN A SERVER GROUP

(75) Inventors: Tienwei Chao, San Jose, CA (US); Bill Shao, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 12/741,225

(22) PCT Filed: Nov. 7, 2008

(86) PCT No.: PCT/US2008/082707
§ 371 (c)(1),
(2), (4) Date: May 4, 2010

(87) PCT Pub. No.: WO2009/061973
PCT Pub. Date: May 14, 2009

(65) Prior Publication Data
US 2010/0265824 A1    Oct. 21, 2010

Related U.S. Application Data

(60) Provisional application No. 60/986,842, filed on Nov. 9, 2007, provisional application No. 61/018,047, filed on Dec. 31, 2007.

(51) Int. Cl.
*G06F 11/00* (2006.01)
(52) U.S. Cl.
USPC ......... 370/229; 370/230; 370/230.1; 370/235
(58) Field of Classification Search
USPC ......... 370/229–235, 392, 465; 709/219–235; 710/61
See application file for complete search history.

(56) References Cited

U.S. PATENT DOCUMENTS

| | | | |
|---|---|---|---|
| 6,377,998 B2 | 4/2002 | Noll et al. | |
| 6,553,030 B2 | 4/2003 | Ku et al. | |
| 6,697,368 B2 * | 2/2004 | Chang et al. | 370/395.1 |
| 6,735,198 B1 | 5/2004 | Edsall et al. | |
| 7,194,550 B1 | 3/2007 | Chamdani et al. | |

(Continued)

OTHER PUBLICATIONS

FULCRUM Microsystems, Load Distribution in Telecom Servers Using FocalPoint Reduces System Cost and Improves System Flexibility, Jul. 2008, 7 pages.

(Continued)

*Primary Examiner* — Mark Rinehart
*Assistant Examiner* — Mang Yeung

(57) ABSTRACT

A switch device includes a packet forwarding table for providing load balancing across servers in a server group. Each table entry maps a hash value to a server in the server group. A hash value can be computed from the destination MAC address, destination IP address, and destination service port in the header of a received packet. The packet forwarding table is searched to find an entry with a hash value that matches the computed hash value and to identify the server to which the matching hash value maps. The switch device forwards the packet to the identified server. Implementing load-balancing decisions in hardware enables packet switching at the line rate of the switch ports. In addition, the hardware-based load balancing performed by the switch device eliminates session tables and the memory to store them, enabling the switch device to handle an unlimited number of client connections.

36 Claims, 12 Drawing Sheets

(56) References Cited

U.S. PATENT DOCUMENTS

| | | |
|---|---|---|
| 7,266,598 B2 | 9/2007 | Rolia |
| 7,821,925 B2 | 10/2010 | Davies |
| 7,978,690 B2 | 7/2011 | Abel et al. |
| 8,160,082 B2 | 4/2012 | Harris et al. |
| 2003/0074467 A1 | 4/2003 | Oblak et al. |
| 2004/0098499 A1* | 5/2004 | Tamai .......................... 709/232 |
| 2005/0111455 A1 | 5/2005 | Nozue et al. |
| 2005/0182815 A1 | 8/2005 | Offredo et al. |
| 2006/0080446 A1 | 4/2006 | Bahl |
| 2006/0095960 A1 | 5/2006 | Arregoces et al. |

OTHER PUBLICATIONS

James Radley, Load Balancing Between Server Blades Within Atca Platforms, Oct. 2007, 4 pages.
Cisco Systems, Inc., Cisco Data Center Infrastructure 2.5 Design Guide, Dec. 6, 2007, 180 pages.
International Preliminary Report on Patentability for PCT/US2008/082707, dated May 11, 2010, 6 pages.
International Search Report and Written Opinion for PCT/US2008/082707 dated Jan. 12, 2009; 8 pages.
Non-Final Office Action in related U.S. Appl. No. 12/664,060, mailed Sep. 13, 2012; 17 pages.
Non-Final Office Action in related U.S. Appl. No. 12/902,703, mailed Aug. 30, 2012; 15 pages.
Cisco Systems, The Global Server Load Balancing Primer, White Paper by Cisco Systems, 2004, 20 pages.
Final Office Action in related U.S. Appl. No. 12/902,703, mailed on Jan. 22, 2013; 15 pages.
Final Office Action in related U.S. Appl. No. 12/664,060, mailed on Mar. 18, 2013; 26 pages.

* cited by examiner

| SEQ. | TRAFFIC DIRECTION | SRC MAC | DEST MAC (DMAC) | SRC IP | DEST IP (DIP) | SRC PORT | DEST PORT (DPORT) |
|---|---|---|---|---|---|---|---|
| 152 | CLIENT TO SWITCH | CMAC | RMAC | CIP | RIP | CPORT | RPORT |
| 154 | SWITCH TO REAL SERVER | CMAC | RMAC | CIP | RIP | CPORT | RPORT |
| 158 | REAL SERVER TO SWITCH | RMAC | CMAC | RIP | CIP | RPORT | CPORT |
| 160 | SWITCH TO CLIENT | RMAC | CMAC | RIP | CIP | RPORT | CPORT |

FIG. 4

| SEQ. | TRAFFIC DIRECTION | SRC MAC | DEST MAC (DMAC) | SRC IP | DEST IP (DIP) | SRC PORT | DEST PORT (DPORT) |
|---|---|---|---|---|---|---|---|
| 152 | CLIENT TO SWITCH | CMAC | VMAC | CIP | VIP | CPORT | VPORT |
| 154 | SWITCH TO REAL SERVER | CMAC | RMAC | CIP | VIP | CPORT | VPORT |
| 158 | REAL SERVER TO SWITCH | RMAC | CMAC | VIP | CIP | VPORT | CPORT |
| 160 | SWITCH TO CLIENT | RMAC | CMAC | VIP | CIP | VPORT | CPORT |

FIG. 5

| SEQ. NO. | TRAFFIC DIRECTION | SRC MAC | DEST MAC (DMAC) | SRC IP | DEST IP (DIP) | SRC PORT | DEST PORT (DPORT) |
|---|---|---|---|---|---|---|---|
| 252 | CLIENT TO SWITCH | CMAC | RMAC | CIP | RIP | CPORT | RPORT |
| 256 | SWITCH TO TRANS. PROXY SERVER | CMAC | PMAC | CIP | RIP | CPORT | RPORT |
| 260 | TRANS. PROXY SERVER TO SWITCH | PMAC | RMAC | PIP | RIP | PPORT | RPORT |
| 262 | SWITCH TO REAL SERVER | PMAC | RMAC | PIP | RIP | PPORT | RPORT |
| 266 | REAL SERVER TO PROXY SERVER | RMAC | PMAC | RIP | PIP | RPORT | PPORT |
| 268 | SWITCH TO PROXY SERVER | RMAC | PMAC | RIP | PIP | RPORT | PPORT |
| 272 | PROXY SERVER TO SWITCH | PMAC | CMAC | RIP | CIP | RPORT | CPORT |
| 274 | SWITCH TO CLIENT | PMAC | CMAC | RIP | CIP | RPORT | CPORT |

*FIG. 9*

| SEQ. NO. | TRAFFIC DIRECTION | SRC MAC | DEST MAC (DMAC) | SRC IP | DEST IP (DIP) | SRC PORT | DEST PORT (DPORT) |
|---|---|---|---|---|---|---|---|
| 304 | CLIENT TO SWITCH | CMAC | VMAC | CIP | VIP | CPORT | VPORT |
| 306 | SWITCH TO OFFLOADER APPLIANCE. | CMAC | PMAC | CIP | VIP | CPORT | VPORT |
| 310 | OFFLOADER APPLIANCE TO SWITCH | PMAC | VMAC | PIP | VIP | RPORT | 80 |
| 312 | SWITCH TO REAL SERVER | PMAC | RMAC | PIP | RIP | RPORT | 80 |
| 314 | REAL SERVER TO SWITCH | RMAC | PMAC | VIP | PIP | 80 | RPORT |
| 318 | SWITCH TO PROXY APPLIANCE | RMAC | PMAC | VIP | PIP | 80 | RPORT |
| 322 | PROXY SERVER TO SWITCH | PMAC | CMAC | RIP | CIP | RPORT | CPORT |
| 324 | SWITCH TO CLIENT | PMAC | CMAC | RIP | CIP | RPORT | CPORT |

*FIG. 12*

SESSION-LESS LOAD BALANCING OF CLIENT TRAFFIC ACROSS SERVERS IN A SERVER GROUP

RELATED APPLICATION

This utility application claims the benefit of U.S. Provisional Patent Application No. 60/986,842, filed on Nov. 9, 2007, and the benefit of U.S. Provisional Application No. 61/018,047, filed on Dec. 31, 2007, the entireties of which applications are incorporated by reference herein.

FIELD OF THE INVENTION

The invention relates generally to packet-forwarding systems. More particularly, the invention relates to hardware-based switching mechanisms for achieving server load balancing across servers in a server group.

BACKGROUND

Traditionally, devices that perform load balancing among networked servers use software and hardware. The software usually operates to setup and tear down traffic flows, whereas the hardware accelerates the delivery of the traffic. Because of their dependency on the software, such devices cannot achieve line rate (i.e., the nominal speed of data transmission). In general, a device is limited by the speed at which the network processor can process software instructions. In addition, the software often employs a session table to record the states of the traffic flows. Consequently, the number of sessions that the device can process is constrained by the amount of memory installed on the system.

FIG. 1 illustrates traditional server load balancing operation in a data switch module 10 having a network processor 12 that runs a server load balancing agent (hereafter, software SLB agent 14) and a server load balancing processing agent (hereafter, hardware SLB agent 16) that forwards the traffic flows in accordance with the software SLB agent 14. The software SLB agent 14 is in communication with a session table 18 stored in memory 20. Packet traffic from a client system 22 arrives (arrow 1) at the switch module 10. The hardware SLB agent 16 forwards (arrow 2) the packet to the software SLB agent 14. After consulting the session table 18, the software SLB agent 14 returns (arrow 3) a packet to the hardware SLB agent 16. The hardware SLB agent 16 sends (arrow 4) the packet to a server in a server farm 24 (the particular server being selected based on load balancing criteria). A packet returns (arrow 5) from the server farm 24 to the hardware SLB agent 16, which sends (arrow 6) the packet to the software SLB agent 14. The software agent 14 returns (arrow 7) a packet to the hardware SLB agent 16, which sends (arrow 8) the packet to the client system 22. Herein, arrows 1 through 8 correspond to packet traffic for setting up (or tearing down) a session between the client system 22 and the server. After a session is established, the client system 22 and the server in the server farm 24 communicate 26 through the hardware SLB agent 16 (the traffic does not pass through the software SLB agent 14). The performance of the load balancing is limited by the speed at which the software SLB agent 14 can process the packet traffic, and the number of sessions that the system can handle is limited by the amount of memory 20 in the system.

SUMMARY

In one aspect, the invention features a method of forwarding incoming client traffic to servers in a group of servers. A packet is received from a client system. The packet includes a packet header with a destination MAC (Media Access Control) address field, a destination IP (Internet Protocol) address field, and a destination service port field. A switch device is provided with a packet forwarding table for providing load balancing across servers in the server group. The packet forwarding table has a plurality of table entries. Each table entry maps a hash value to a server in a server group. The switch device computes a hash value from a combination of data in the destination MAC address, destination IP address, and destination service port fields of the packet header of the received packet. The switch device searches the packet forwarding table to find a table entry with a hash value that matches the computed hash value and to identify, from the table entry, the server in the server group to which the matching hash value maps. The switch device forwards the packet to the identified server.

In another aspect, the invention features a method of forwarding incoming client traffic to servers in a group of servers. A switch device is provided with a packet forwarding table for providing load balancing across servers in a server group. The packet forwarding table has a plurality of table entries. Each table entry maps a hash value to a server in the server group. A virtual IP address and a virtual MAC address are assigned to each real server in a real server group. The assigned virtual IP address is the same virtual IP address for each real server in the real server group and the assigned virtual MAC address is the same virtual MAC address for each real server in the real server group. A packet is received from a client system addressed to the virtual IP address and the virtual MAC address. The switch device computes a hash value from a source address in a packet header of the received packet, searches the packet forwarding table to find a table entry with a hash value that matches the computed hash value and to identify the server in the server group to which the matching hash value maps, and forwards the packet to the identified server.

In another aspect, the invention features a switch device, comprising first and second ports. A first port receives a packet from a client system. The packet includes a packet header with a destination MAC (Media Access Control) address field, a destination IP (Internet Protocol) address field, and a destination service port field. A packet forwarding table provides load balancing across servers in a server group. The packet forwarding table has a plurality of table entries, each table entry mapping a hash value to a server in the server group. A frame processor is configured to compute a hash value from a combination of data in the destination MAC address, destination IP address, and destination service port fields of the packet header of the received packet, search the packet forwarding table to find a table entry with a hash value that matches the computed hash value and to identify the server in the server group to which the matching hash value maps, and forward the packet through the second port to the server in the server group.

In still another aspect, the invention features a switch device comprising first and second ports. A first port receives a packet from a client system addressed to a virtual IP address and a virtual MAC address. The virtual IP address and the virtual MAC address are assigned to each real server in a real server group with which the switch device is in communication. The assigned virtual IP address is the same virtual IP address for each real server in the real server group and the assigned virtual MAC address is the same virtual MAC address for each real server in the real server group. A packet forwarding table provides load balancing across servers in a server group. The packet forwarding table has a plurality of table entries, each table entry mapping a hash value to a server in a server group. A frame processor is configured to compute a hash value from a source address in a packet header of the received packet, search the packet forwarding table to find a table entry with a hash value that matches the computed hash value and to identify the server in the server group to which the matching hash value maps, and forward the packet through the second port to the identified server in the server group.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIG. 4 is a table illustrating header contents of packets forwarded during a first example illustration of the process of FIG. 2.

FIG. 5 is a table illustrating header contents of packets forwarded during a second example illustration of the process of FIG. 2.

FIG. 9 is a table showing the header contents of various packets forwarded to and from the switch device of FIG. 8 during the process of FIG. 7.

FIG. 12 is a table showing the header contents of various packets forwarded to and from the switch device of FIG. 11 during the process of FIG. 10.

DETAILED DESCRIPTION

Figure 1:
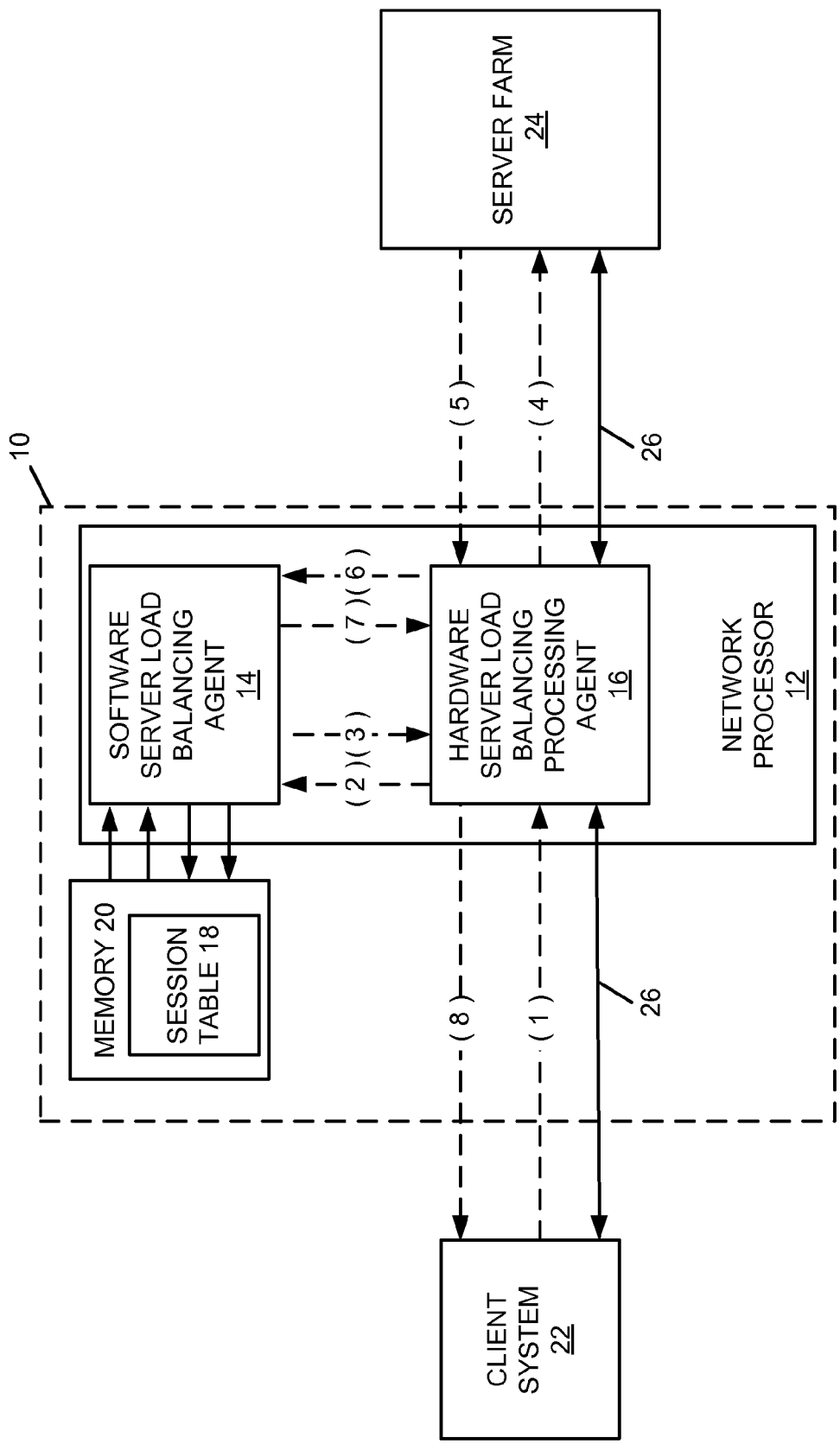
FIG. 1 is a diagram of a switch module engaged in traditional server load balancing behavior.

Systems, packet switches, and switch devices constructed in accordance with the invention "sessionlessly" execute load balancing decisions across servers in hardware. "Sessionlessly", as used herein, refers to the ability to direct packets belonging to particular client traffic flows towards their destinations without having to record and access the state of each traffic flow in a session table. Beneficially, the invention eliminates any need for a software server load balancing agent (as described in FIG. 1) and leads to a savings in system memory traditionally used to store a session table. Moreover, the use of hardware to execute load balancing decisions enables packet switching at the line rate of the switch ports (e.g., 10 Gb).

Figure 2:
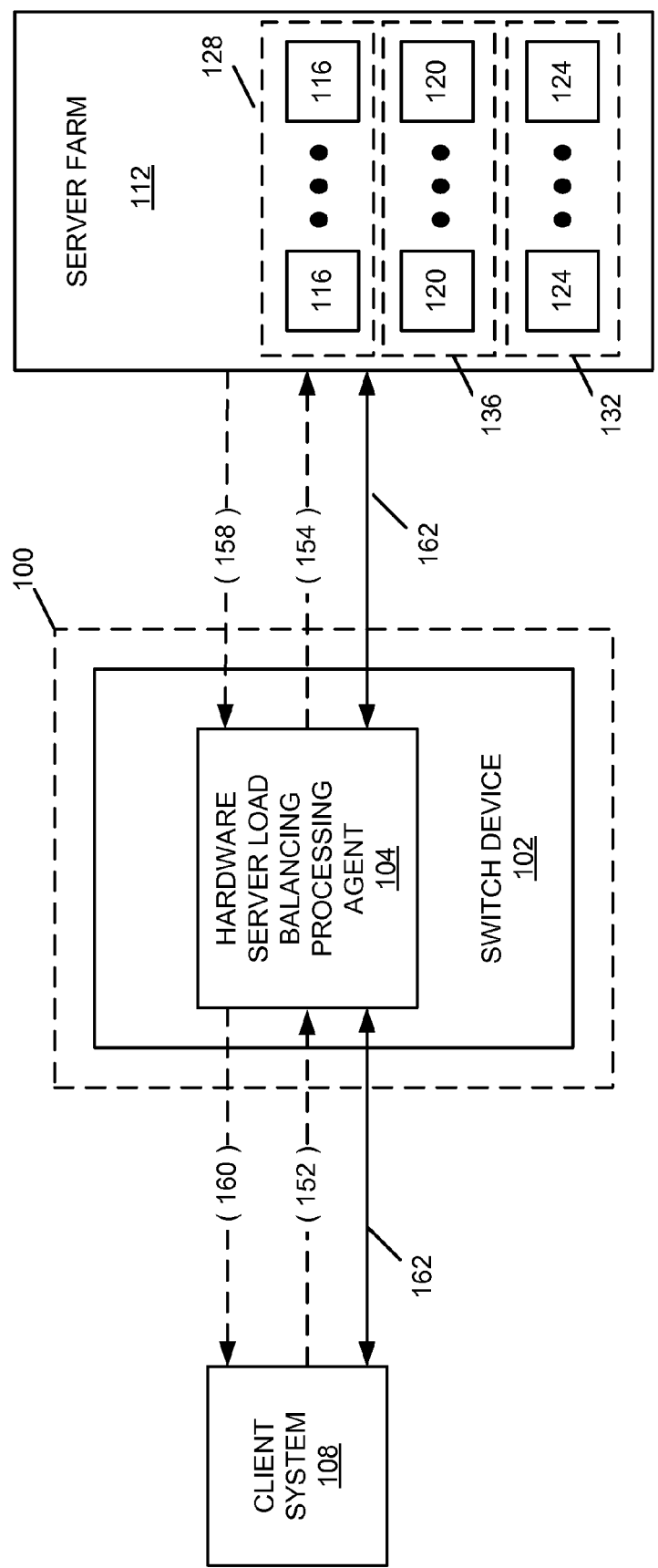
FIG. 2 is a functional block diagram representation of an embodiment of a switch device engaged in server load balancing in accordance with the invention.

FIG. 2 shows a switch module 100 for performing server load balancing operations in accordance with the principles of one embodiment of the invention. The switch module 100 includes a switch device 102 with a hardware-implemented SLB processing agent 104 (hereafter, hardware SLB agent) that is in communication with a client system 108 (also called a host) and with a server farm 112. The hardware SLB agent 104 is comprised of special-purpose circuitry configured to make load balancing decisions for client traffic flows handled by the switch module 100 across the servers in the server farm 112, as described herein. In brief, the hardware SLB processing agent 104 handles the traffic flow of entire sessions to achieve 10 GB line rate per port. By having the hardware SLB processing agent 104 handle all traffic, the switch module is not limited by the processing power and system memory of a software SLB agent.

The server farm 112 includes a plurality of servers. The servers of the server farm 112 can include transparent proxy servers 116, non-transparent proxy servers (not shown), proxy appliances 120, real servers 124, and combinations thereof. In general, a transparent proxy server 116 processes client system requests, which have been addressed by the client systems to a real server, in a fashion transparent (i.e., unknown) to the user of the client system. For example, a client system may have submitted an https: request to a real server address, and, before the real server can process the request, a transparent server intervenes and examines the request to verify the security of the request. Servers of a common type may be grouped, and load balancing can be performed across servers of a given group as described herein. For example, a given transparent proxy server 116 can belong to a transparent proxy server group 128, proxy appliances can belong to a proxy appliance group 136, and a given real server 124 can belong to a real server group 132. The servers of the server farm 112 can be collocated within a single chassis (with or without the switch module 100) or be installed in a plurality of chassis.

Figure 3:
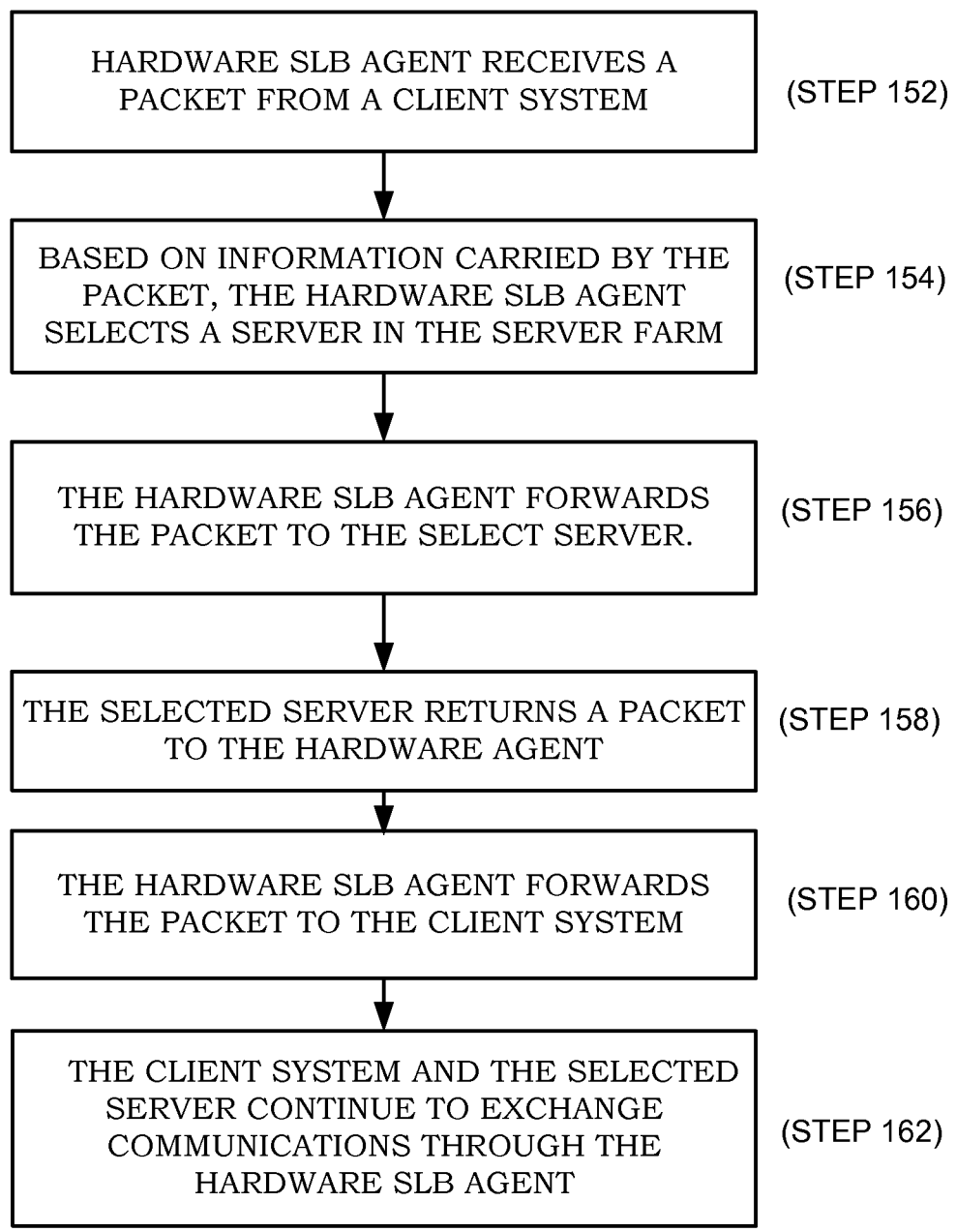
FIG. 3 is a flow diagram of an embodiment of process for performing load balancing in accordance with one embodiment of the invention.

FIG. 3 shows an embodiment of a general process 150 performed by the switch module 100 to establish a session between the client system 108 and a server in a server farm 112. Some of the reference numerals given to steps recited in connection with FIG. 3 have correspondingly numbered arrows shown in FIG. 2. At step 152, the hardware SLB agent 104 receives a packet (or frame) from the client system 108. Based on address information carried by the packet, the hardware SLB agent 104 selects (step 154) a server in the server farm 112, and then forwards (step 156) the packet to the selected server. The server returns (step 158) a packet to the hardware SLB agent 104, which forwards (step 160) the packet to the client system 108. Communications exchanged (step 162) after the session is established between the client system 108 and the selected server continue to pass through the hardware SLB agent 104.

As described further below, the selection of the server can be based on a hash of destination address information or on a hash of source address information in the packet header, depending upon the particular embodiment of the hardware SLB agent 104. In one embodiment, the destination address information used to select a server includes the MAC address of the real server to which the packet is addressed, referred to as RMAC, the IP address of the real server, referred to as RIP, and the service port that the real server is listening to, referred to as RPORT. FIG. 4 shows, in table format, the contents of the packet headers in accordance with this embodiment. The sequence numbers in the table of FIG. 4 correspond to the numbered arrows of FIG. 2 and to the step numbers of FIG. 3.

In another embodiment, referred to as direct server return, the destination address information in each packet received from a client system 108 includes a Virtual MAC (VMAC) address, a Virtual IP (VIP) address, and a virtual server service port (VPORT). In this embodiment, each real server 124 in the server farm 112 is assigned the same VMAC address, the same VIP address, and the same Virtual Server service port. In addition, each real server 124 configures 2 different IP addresses on its network interface card. One of the configured IP addresses is the VIP, and the other is the actual IP address of the real server. Accordingly, the client systems issue packets with the VIP and VMAC addresses, and source address information in the headers of such packets, such as the source MAC address or source IP address, is used to select the server to which to forward the packet.

Because all real servers have configured the same VIP, the switch device 102 filters out all traffic from real servers 124 that advertise this VIP. This filtering prevents the real servers 124 in a chassis from objecting to a duplicated IP address configured on another real server. In addition, if external devices (i.e., client/host systems) issue an ARP (address resolution protocol) probe for the VIP, the switch device 102 intercepts such ARP requests and returns the VIP with the VMAC. Although only one group 132 of real servers 124 is shown, the switch device 102 may be in communication with more than one group—and each group of real servers has its own unique VMAC and VIP addresses.

FIG. 5 shows, in table format, the contents of the packet headers in accordance with this embodiment (i.e., direct server return). The sequence numbers correspond to the numbered arrows of FIG. 2 and step numbers of FIG. 3. A packet arrives at the switch device 102 with the VMAC, VIP, and VPORT addresses. The switch device 102 changes the VMAC address in the packet header to the RMAC address of a selected real server (selected in accordance with a load-balancing mechanism described below). The packet header also includes the client MAC address (CMAC), the client IP address (CIP), and the service port (CPORT) of the client system 108 that issued the request. The flow of packet traffic is referred to as direct server return because the real server 124 in the server farm 112 that receives and processes the forwarded packet traffic sends back, in response, packet traffic (e.g., a client-requested Web page) directly to the switch device 102. The source MAC, IP, and Port addresses in the returned packet traffic are the RMAC, VIP, and VPORT addresses of the real server that handled the request; the destination addresses in the returned packet traffic are CMAC, CIP, and CPORT of the client system that requested information. The switch device 102 forwards the packet traffic received from the real server 124 to the client system 108.

Figure 6:
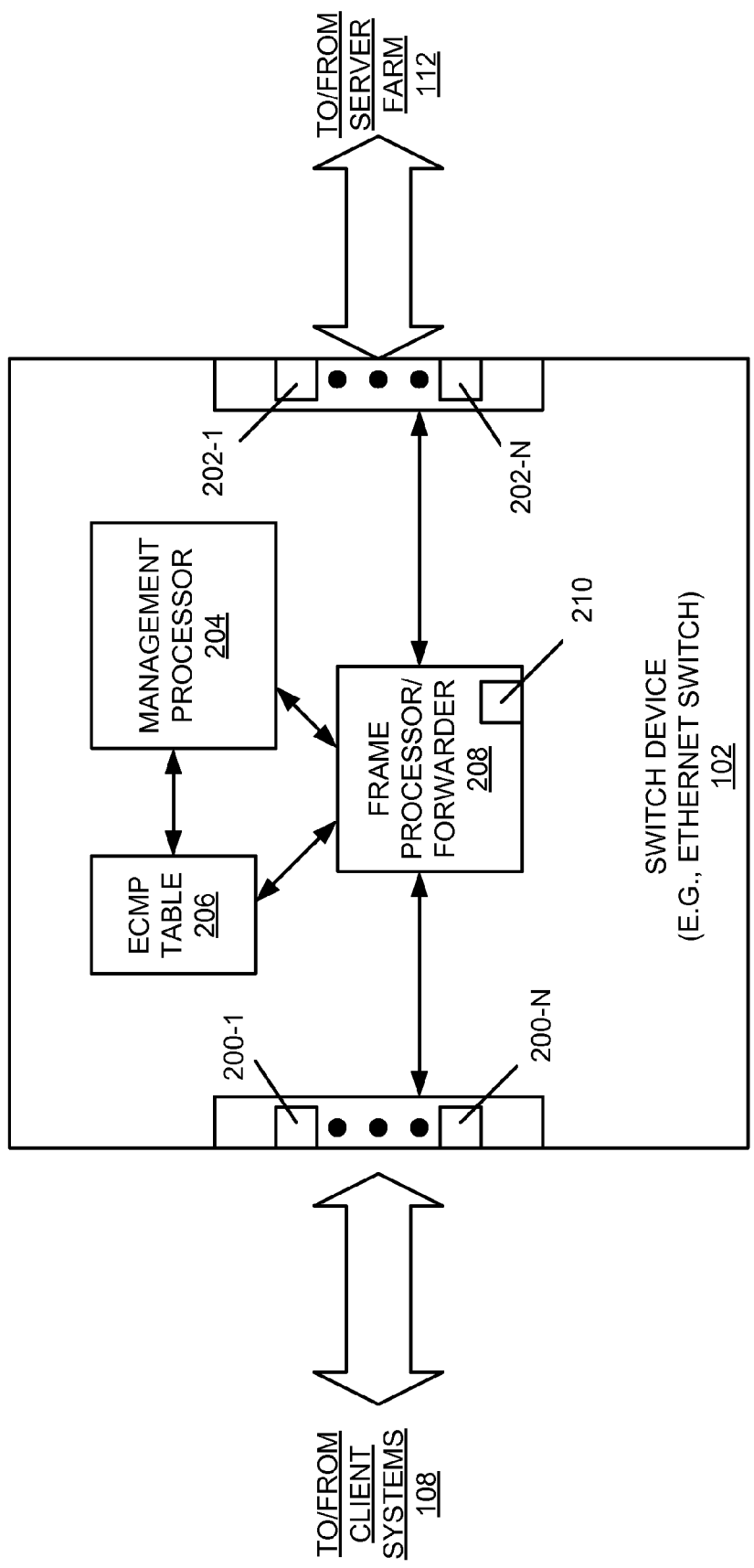
FIG. 6 is a functional block diagram representation of an embodiment of a switch device used to server load balance.

FIG. 6 shows an example embodiment of the switch device 102 of FIG. 2 comprising a plurality of ports 200-1, 200-N (generally, 200) that are in communication with client systems 108, and a plurality of ports 202-1, 202-N (generally, 202) that are in communication with servers of the server farm 112. The switch device 102 can have fewer or more than the number of ports shown. The switch device 102 includes a management processor 204, an Equal Cost Multi-Path (ECMP) table 206, and a frame processor/forwarder 208. In one embodiment, the ports 200, 202 of the switch device 102 support 10 GB line rates. The switch device 102 can be implemented with ASIC (Application Specific Integrated Circuit) technology on one or more semiconductor chips. In one embodiment, the switch device 102 is a 10 Gb Ethernet switch chip.

The ECMP table 206 contains information that directs the forwarding of ingress client traffic. In general, ECMP is a forwarding mechanism that routes packets along multiple paths of equal cost. Each entry of the ECMP table 206 maps a unique hash value to a server in the server farm 112. The result of hashing is to distribute the various client traffic flows across the servers in a server group. Thus, ECMP aims to balance the client traffic load equally across the paths. Depending on the health of the servers, the management processor 204 dynamically adds to or removes server entries from the ECMP table 206.

The frame processor/forwarder 208 includes hardware logic 210 for executing the load balancing process, as described herein. The logic 210 may be implemented as hardware, software, or a combination of hardware and software. In general, the logic 210 examines specific content in the header of a received frame, generates a hash value based on header content of the frame, searches the entries of the ECMP table 206 using the generated hash value, and, based on the server identified in a matching entry, redirects the frame to a particular port of the switch device 102.

In one embodiment, the frame processor/forwarder 208 is configured to redirect a particular client traffic flow to a particular transparent proxy server 116 of the server farm 112. A hash function is performed on the combined contents of the DMAC, DIP, and DPORT in the header of the packet. As examples, these values can be summed and then hashed, or concatenated and then hashed. The resulting hash value is used to find a matching entry in the ECMP table 206, which maps the hash value to the particular transparent proxy server 116. Each packet belonging to a particular client traffic flow (or session) has the same destination information (DMAC, DIP, and DPORT), and, therefore, the resulting hash value of every packet of that client traffic flow maps to the same entry in the ECMP table 206. This consistent mapping ensures that the frame processor/forwarder 208 forwards each packet of the given traffic flow to the same transparent proxy server 116.

The frame processor/forwarder 208 can also be configured to redirect all ingress client traffic to the transparent proxy servers 116 in a transparent proxy server group. For this configuration, the entries of the ECMP table map hash values to the transparent proxy servers 116 in a transparent proxy server group, and load balancing, as determined by the ECMP table 206, is achieved across the transparent proxy servers. The frame processor/forwarder 208 makes a next routing decision by performing a hash operation on the combination of the contents of the DMAC, DIP, and DPORT fields of the packet header, accessing the ECMP table 206 to find a matching entry, and identifying the transparent proxy server in the group corresponding to that matched entry.

In the direct server return embodiment, the frame processor/forwarder 208 is configured to redirect a particular client traffic flow to a particular offloader proxy appliance 102 of the server farm 112. A hash function is performed on the source MAC address, on the source IP address, or on a combination thereof in the header of the packet. Again, the resulting hash value is used to find a matching entry in the ECMP table 206, which maps the hash value to an offloader proxy appliance 120.

The management processor 204 checks the health of the servers in the server farm 112. A given proxy server can belong to the proxy server group and a given real server can belong to a real server group only if that server is in a healthy state. The management processor 204 constantly monitors the health of proxy and real servers by using various health-check mechanisms. Examples of such health-check mechanisms include, but are not limited to, a link-state health check, a PING health check, a UDP/TCP (User Datagram protocol/

Transmission Control Protocol) health check, and a service-based health check. An administrator configures the particular health-check mechanism used by the switch device 102.

When a server failure occurs (a proxy server or a real server), the failing server is removed from its server group. The traffic that was flowing to the healthy servers in the affected server group continues to flow persistently to those healthy servers. The traffic that was flowing to the failed server is redistributed to the healthy servers in the affected server group. This redistribution is accomplished by changing the table entry with the hash value that maps to the failed server so that the hash value now maps to one of the healthy servers in the affected server group.

In one embodiment, the decision as to which healthy server to use is based on the health of the server with the next index value. For example, consider a server group of four servers, numbered 1, 2, 3, and 4. The ECMP table 206 has 4 entries; each entry in the ECMP table maps a hash value to a different one of the 4 servers. A first hash value maps to server number 1, a second hash value maps to server number 2, a third hash value maps to server number 3, and a fourth hash value maps to server number 4. If server number 2 fails, while servers numbered 1, 3 and 4 remain healthy, server number 3 replaces the position of server number 2 in the hash table. More specifically, the first hash value continues to map to server number 1, the second hash value now maps to server number 3, the third hash value continues to map to server number 3, and the fourth hash value continues to map to server number 4. If, instead, server number 4 fails, the fourth hash value is changed to map to server number 1 (wraps around).

Figure 7:
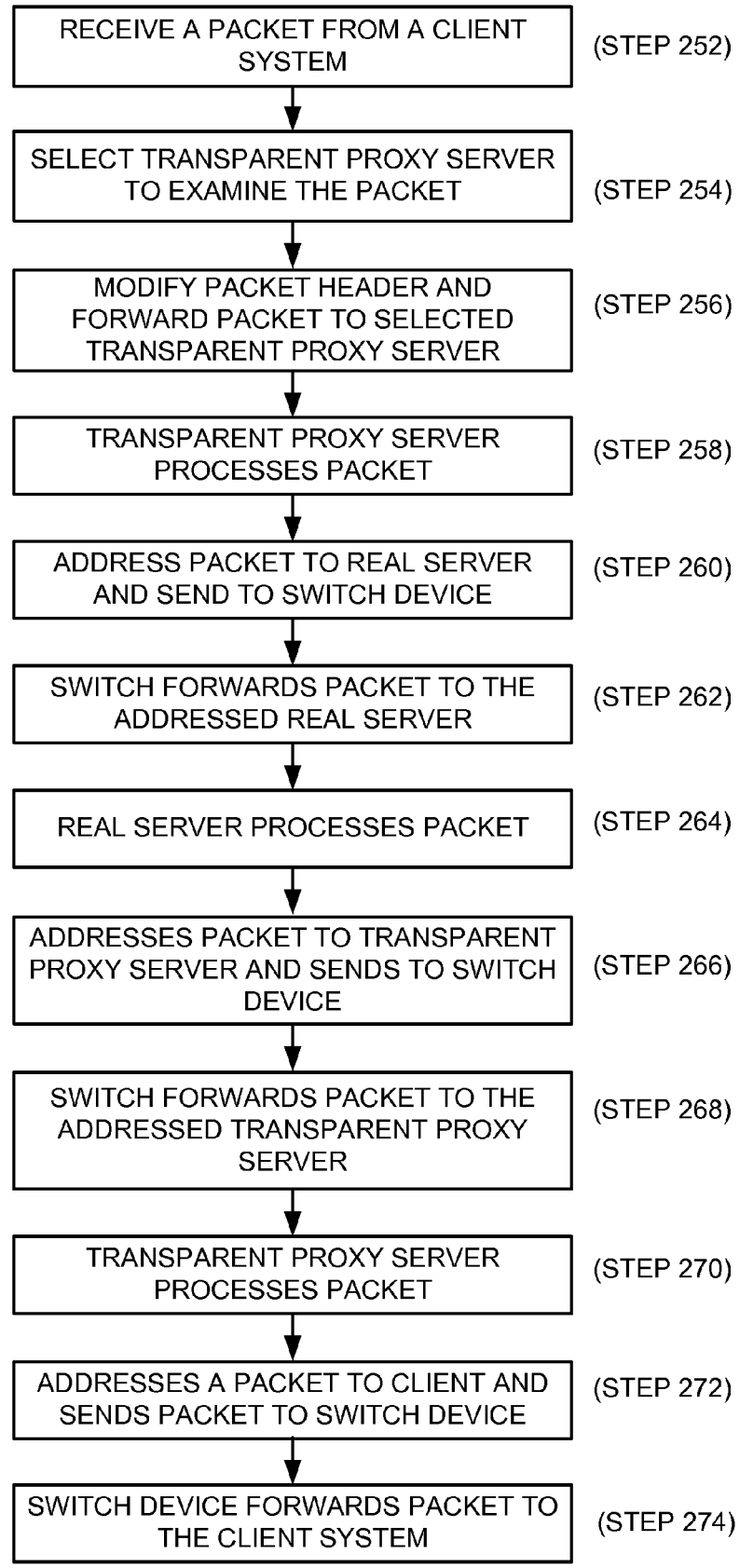
FIG. 7 is a flow diagram of an embodiment of a process of redirecting incoming client traffic to transparent proxy servers in a transparent proxy server group.

FIG. 7 shows an example embodiment of a process 250 by which the switch device 102 redirects incoming client traffic to transparent proxy servers 116 in a transparent proxy server group 128. The distribution (i.e., load balancing) of ingress client traffic flows occurs transparently with respect to the client systems from which the traffic flows originate. During the process 250 described below, the switch device 102 is forwarding the client traffic to a select transparent proxy server 116.

Figure 8:
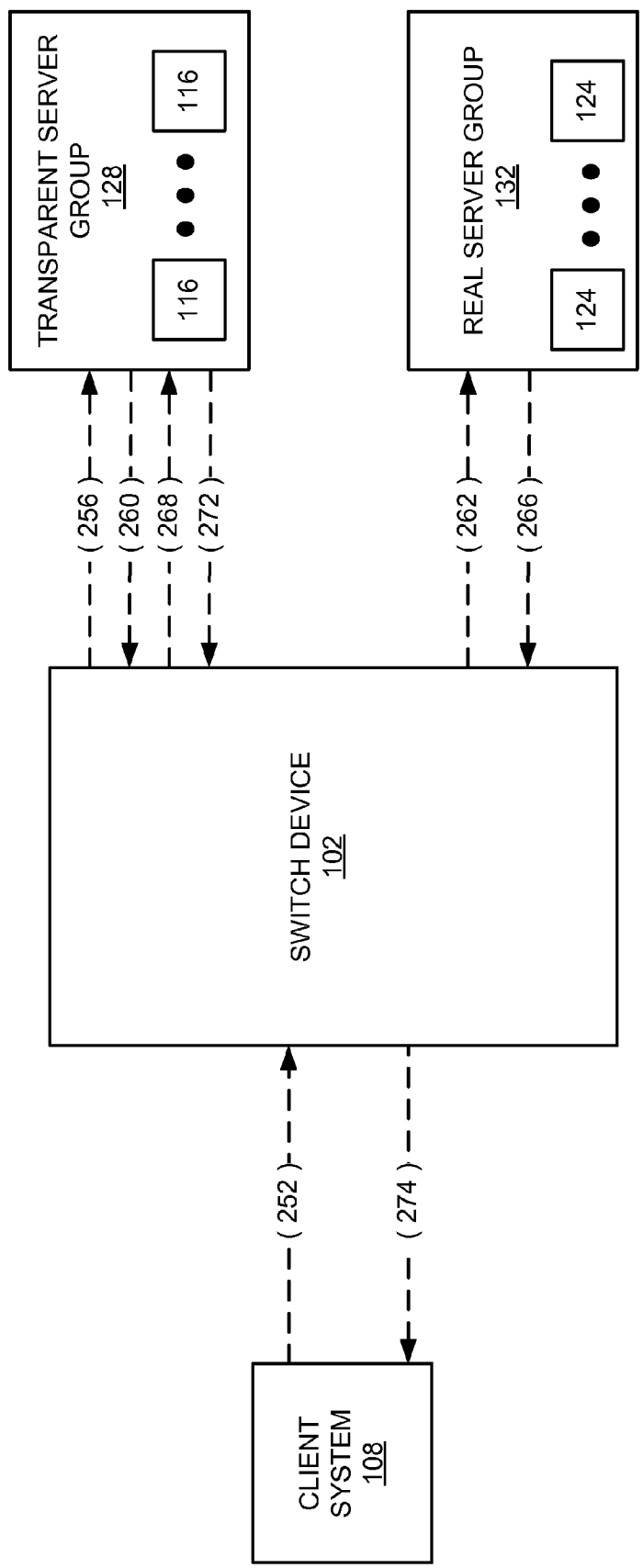
FIG. 8 is a functional block diagram representation of a switch device participating in the process of FIG. 7.

In the description of the process 250, reference is also made to FIG. 8, which shows the switch device 102 in communication with client systems 108, with a group of transparent proxy servers 116, and with a group of real servers 124; and to FIG. 9, which shows in table format the header contents of the various packets forwarded during the process 250. The numbered arrows in FIG. 8 represent packet traffic that passes between the various systems and servers; each numeral corresponds to one of the enumerated steps in FIG. 7.

In general, the switch device 102 provides a persistent path by sending all packets in the same flow of client traffic to the same transparent proxy server to "setup" and "tear down" that client traffic flow. Accordingly, the switch device 120 does not need to perform these "setup" and "tear down" operations. In addition, sending the same flow of traffic to the same transparent proxy server (using the hash function and ECMP table) dispenses with any need for the given switch module 100 to maintain the state of any particular client flow.

At step 252, the switch device 102 receives a packet from the client system 108. The source MAC address and source IP address are the MAC address (CMAC) and IP address (CIP), respectively, of the client system 108. The destination MAC address and destination IP address are the MAC address (RMAC) and IP address (RIP), respectively, of a real server 124 to which the packet is addressed. The source port is a client port (CPORT) and the destination port is a real server service port (RPORT).

The switch device 102 selects (step 254) a transparent proxy server 116 in the transparent proxy server group, in accordance with the server load balancing mechanism described above that is based on a hash of the destination address information. In addition, the switch device 102 changes the destination MAC address in the packet to the MAC address (PMAC) of the selected transparent proxy server and forwards (step 256) the packet accordingly.

The selected transparent proxy server 116 processes (step 258) the packet (e.g., to perform decryption) arriving from the switch device 102, and addresses a resulting packet to a real server 124 in the real server group. The source MAC address of the sent packet is PMAC, the source IP address is PIP, the source port is PPORT; the destination MAC address in the sent packet is RMAC (the MAC address of the real server), the destination IP address is RIP, and the destination port is RPORT. The transparent proxy server 116 sends (step 260) the packet to the switch device 102, and the switch device 102 forwards (step 262) the packet to the identified real server 124.

The real server 124 processes (step 264) the packet received from the switch device 102 and sends a packet (step 266) back to the transparent proxy server 116. The packet header has the RMAC as the source MAC address, the PMAC as the destination MAC address, the RIP as the source IP address, the PIP as the destination IP address, the RPORT as the source port, and the PPORT as the destination port. The switch device 102 forwards (step 268) the packet to the transparent proxy server 116.

At step 270, the transparent proxy server 116 processes the packet received from the switch device 102 (e.g., to encrypt the contents of the packet). The source and destination MAC addresses of the packet header of the resulting packet are PMAC and CMAC, respectively; the contents of the source and destination IP addresses are RIP and CIP, respectively; and the source and destination ports to RPORT and CPORT, respectively. The transparent proxy server 116 sends (step 272) the packet to the switch device 102, and the switch device 102 forwards (step 274) the packet to the client system 108.

Direct Server Return

Figure 10:
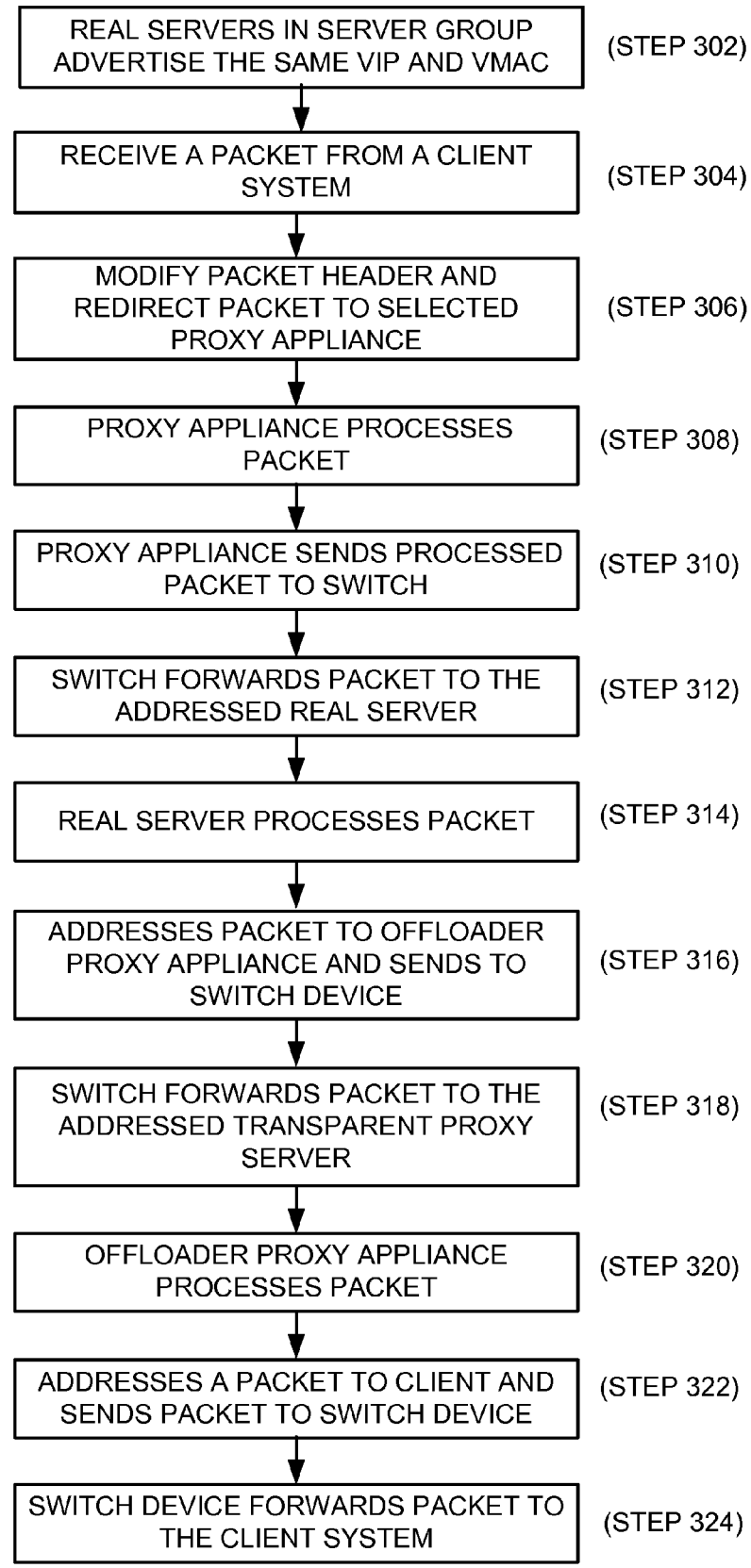
FIG. 10 is a flow diagram of an embodiment of a process of redirecting incoming client traffic to offloader proxy appliances in a proxy appliance group.
Figure 11:
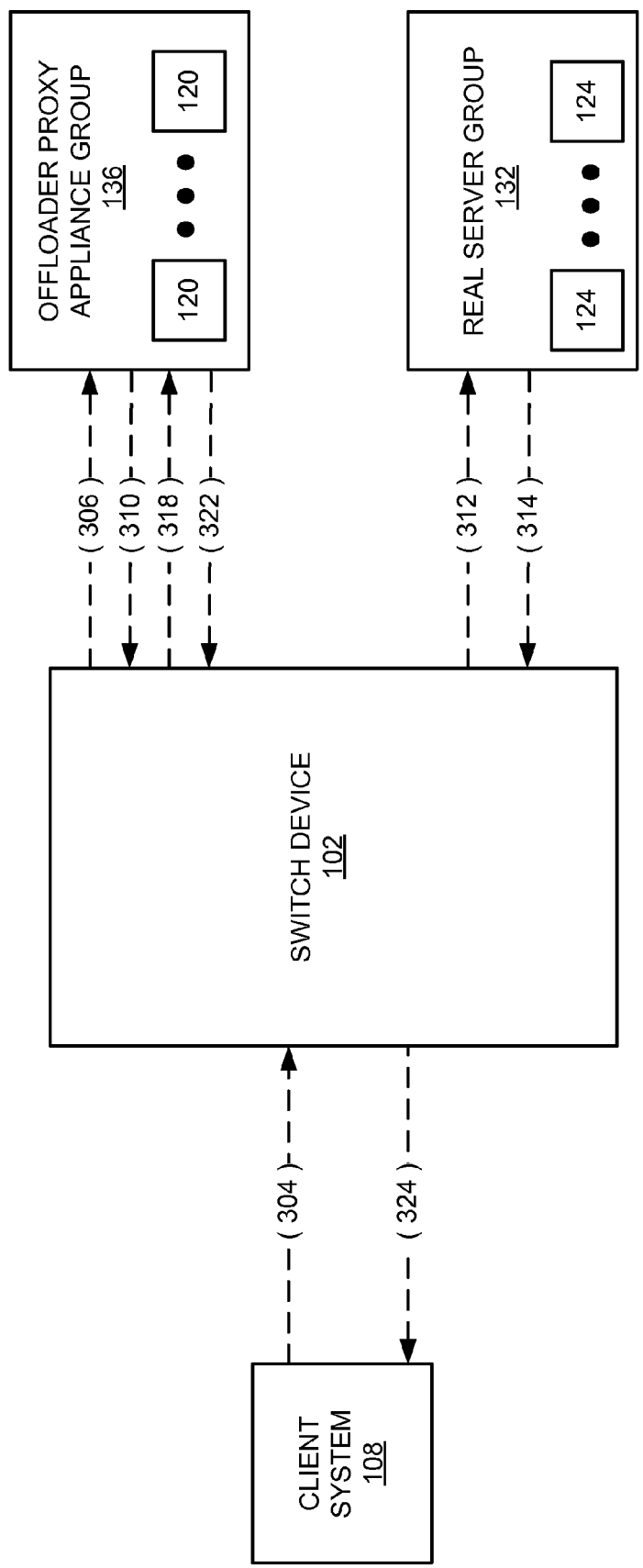
FIG. 11 is a functional block diagram representation of a switch device participating in the process of FIG. 10.

FIG. 10 shows an example embodiment of a process 300 by which the switch device 102 redirects incoming client traffic to offloader proxy appliances 120 and load balances the client traffic among real servers 124 in a real server group 132. In the description of the process 300, reference is also made to FIG. 11, which shows the switch device 102 in communication with the client system 108, with a group 136 of offloader proxy servers 120, and with a group 132 of real servers 124; and to FIG. 12, which shows in table format the header contents of the various packets forwarded during the process 300. The numbered arrows in FIG. 11 represent packet traffic that passes between the various systems and servers; each numeral corresponds to one of the enumerated steps in FIG. 10.

For this embodiment, each real server 124 in the real server group 132 advertises (step 302) the same VMAC and the same VIP addresses. Each packet of client traffic that arrives (step 304) at the switch device 102 is addressed to the same VIP and the VMAC (i.e., because of the advertisement of the same VIP and VMAC addresses for each real server). The source MAC address and source IP address are the MAC address (CMAC) and IP address (CIP), respectively, of the client system 108. The destination MAC address and destination IP address are the MAC address (VMAC) and IP address (VIP), respectively, of a virtual server. The source port is a client port (CPORT) and the destination port is a virtual server service port (VPORT).

The switch device 102 redirects (step 306) the client traffic to a select offloader proxy appliance 120. As previously described, the selection of the proxy appliance 120 is based on a hashed value of the source MAC address, source IP address, or a combination thereof. The switch device 102 changes the destination MAC address in the packet header to the MAC address (PMAC) of the selected proxy appliance 120 and forwards the packet.

The selected offloader proxy appliance 120 processes (step 308) the client traffic and returns (step 310) it to the switch device 102. The processing performed by the offloader proxy appliance 120 can be, for example, to decrypt the packet contents (e.g., if sent via the IMPS protocol). The packet header includes a source MAC address of PMAC, a destination MAC address of VMAC, a source IP address of PIP, a destination IP address of VIP, a source service port of RPORT, and a destination service port as port 80 (the port number of a Web server), The switch device 102 then selects a real server 124 in the real server group 132 based on source address information as described above in connection with the direct server return embodiment, modifies the packet header to have a destination MAC address of RMAC and a destination IP address of RIP, and forwards (step 312) the packet to the selected real server 124.

The selected real server 124 receives and processes (step 314) the client traffic, and replies (step 316) directly to the switch device 102. The RMAC of the real server 124 is the source MAC address in the packet header, the PMAC of the proxy appliance that previously processed the client traffic is the destination MAC address, port 80 is the source service port, RPORT is the destination service port, the VIP is the source IP address, and the PIP is the destination IP address. The switch device 102 forwards (step 318) the reply to the offloader proxy appliance 120.

The offloader proxy appliance 120 processes (step 320) the reply (e.g., adding encryption, IMPS) and returns (step 322) a processed reply to the switch device 102. The packet header contents includes source and destination MAC addresses of PMAC and CMAC, respectively, source and destination IP addresses of VIP and CIP, respectively, and source and destination ports of VPORT and CPORT, respectively. The switch device 102 forwards (step 324) the processed reply to the client system 108.

Embodiments of the described invention may be implemented in hardware (digital or analog), software (program code), or combinations thereof. Program code implementations of the present invention may be embodied as computer-executable instructions on or in one or more articles of manufacture, or in or on computer-readable medium. A computer, computing system, or computer system, as used herein, is any programmable machine or device that inputs, processes, and outputs instructions, commands, or data. In general, any standard or proprietary, programming or interpretive language can be used to produce the computer-executable instructions. Examples of such languages include C, C++, Pascal, JAVA, BASIC, Visual Basic, and C#.

Examples of articles of manufacture and computer-readable medium in which the computer-executable instructions may be embodied include, but are not limited to, a floppy disk, a hard-disk drive, a CD-ROM, a DVD-ROM, a flash memory card, a USB flash drive, an non-volatile RAM (NVRAM or NOVRAM), a FLASH PROM, an EEPROM, an EPROM, a PROM, a RAM, a ROM, a magnetic tape, or any combination thereof. The computer-executable instructions may be stored as, e.g., source code, object code, interpretive code, executable code, or combinations thereof.

While the invention has been shown and described with reference to specific preferred embodiments, it should be understood by those skilled in the art that various changes in form and detail may be made therein without departing from the spirit and scope of the invention as defined by the following claims. For example, although illustrated herein with respect to mechanisms that can achieve a line rate of 10 Gb of the switch ports, the invention applies also to higher and lower line rates.

What is claimed is:

1. A method of forwarding incoming client traffic to servers in a group of servers, the method comprising:
   receiving a packet from a client system, the packet including a packet header with a destination MAC (Media Access Control) address field, a destination IP (Internet Protocol) address field, and a destination service port field;
   providing a single switch device with a single packet forwarding table for providing load balancing across servers in a server group, the packet forwarding table having a plurality of table entries, each table entry mapping a hash value to a server in a server group;
   computing, by the single switch device, a hash value from a combination of data in the destination MAC address, destination IP address, and destination service port fields of the packet header of the received packet;
   searching, by the single switch device, the single packet forwarding table to find a table entry with a hash value that matches the computed hash value and to identify, from the table entry, the server in the server group to which the matching hash value maps; and
   forwarding sessionlessly, by the single switch device, the packet to the identified server.

2. The method of claim 1, wherein the server to which the identified table entry maps the computed hash value is a transparent proxy server.

3. The method of claim 1, wherein the server to which the identified table entry maps the computed hash value is an offloader proxy appliance.

4. The method of claim 1, wherein the server to which the identified table entry maps the computed hash value is a real server.

5. The method of claim 1, further comprising handling, by the single switch device, a number of connections with client systems unlimited by memory requirements for storing client traffic sessions.

6. The method of claim 1, further comprising switching, by the single switch device, incoming client traffic to the identified server at a 10 Gb line rate per port.

7. A method of forwarding incoming client traffic to servers in a group of servers, the method comprising:
   providing a single switch device with a packet forwarding table for providing load balancing across servers in a server group, the packet forwarding table having a plurality of table entries, each table entry mapping a hash value to a server in the server group;
   assigning a virtual IP address and a virtual MAC address to each real server in a real server group, wherein the assigned virtual IP address is the same virtual IP address for each real server in the real server group and the assigned virtual MAC address is the same virtual MAC address for each real server in the real server group;
   receiving a packet from a client system addressed to the virtual IP address and the virtual MAC address;

computing, by the single switch device, a hash value from a source address in a packet header of the received packet;

searching, by the single switch device, the packet forwarding table to find a table entry with a hash value that matches the computed hash value and to identify, from the table entry, the server in the server group to which the matching hash value maps; and forwarding sessionlessly, by the single switch device, the packet to the identified server.

8. The method of claim 7, further comprising intercepting and dropping, by the single switch device, advertisements of the virtual IP address issued by any of the real servers in the real server group.

9. The method of claim 7, further comprising intercepting, by the single switch device, requests from client systems to find a hardware address associated with a real server in the real server group and replying to the requests with the virtual IP address and the virtual MAC address.

10. The method of claim 7, further comprising advertising, by the single switch device, the virtual IP address to external devices.

11. The method of claim 7, further comprising configuring a network interface card of each real server in the real server group with the virtual IP address and a unique real server IP address.

12. The method of claim 7, wherein the server to which the identified table entry maps the computed hash value is a transparent proxy server.

13. The method of claim 7, wherein the server to which the identified table entry maps the computed hash value is an offloader proxy appliance.

14. The method of claim 7, wherein the server to which the identified table entry maps the computed hash value is a real server.

15. The method of claim 7, further comprising handling, by the single switch device, a number of connections with client systems unlimited by memory requirements for storing client traffic sessions.

16. The method of claim 7, further comprising switching, by the single switch device, incoming client traffic to the identified server at a 10 Gb line rate per port.

17. A switch device comprising:

first and second ports, a first port receiving a packet from a client system, the packet including a packet header with a destination MAC (Media Access Control) address field, a destination IP (Internet Protocol) address field, and a destination service port field;

a packet forwarding table for providing load balancing across servers in a server group, the packet forwarding table having a plurality of table entries, each table entry mapping a hash value to a server in the server group; and a frame processor configured to compute a hash value from a combination of data in the destination MAC address, destination IP address, and destination service port fields of the packet header of the received packet, search the packet forwarding table to find a table entry with a hash value that matches the computed hash value and to identify the server in the server group to which the matching hash value maps, and forward sessionlessly the packet through the second port to the identified server in the server group.

18. The switch device of claim 17, wherein the server to which the identified table entry maps the computed hash value is a transparent proxy server of in transparent proxy server group.

19. The switch device of claim 17, wherein the server to which the identified table entry maps the computed hash value is an offloader proxy appliance in an offloader proxy appliance group.

20. The switch device of claim 17, wherein the server to which the identified table entry maps the computed hash value is a real server in a real server group.

21. The switch device of claim 17, wherein the switch device is capable of handling number of connections with client systems without limit because of memory requirements for storing client traffic sessions.

22. The switch device of claim 17, wherein each port operates at a line rate of at least as fast as 10 Gb, and the switch device switches the packet received at the first port for forwarding to the identified server through the second port at the 10 Gb line rate per port.

23. The switch device of claim 17, wherein the switch device further comprises a management processor for checking a health status of each server in the server group.

24. The switch device of claim 23, wherein the management processor removes a server from the packet forwarding table if the server fails a health status check.

25. A switch device, comprising:

first and second ports, a first port receiving a packet from a client system addressed to a virtual IP address and a virtual MAC address, the virtual IP address and the virtual MAC address being assigned to each real server in a real server group with which the switch device is in communication, the assigned virtual IP address being the same virtual IP address for each real server in the real server group and the assigned virtual MAC address being the same virtual MAC address for each real server in the real server group;

a packet forwarding table for providing load balancing across servers in a server group, the packet forwarding table having a plurality of table entries, each table entry mapping a hash value to a server in a server group; and a frame processor configured to compute a hash value from a source address in a packet header of the received packet, search the packet forwarding table to find a table entry with a hash value that matches the computed hash value and to identify the server in the server group to which the matching hash value maps, and forward sessionlessly the packet through the second port to the identified server in the server group.

26. The switch device of claim 25, wherein the switch device is configured to intercept and drops advertisements of the virtual IP address issued by any of the real servers in the real server group.

27. The switch device of claim 25, wherein the switch device is configured to intercept requests from client systems to find a hardware address associated with a real server in the real server group and replies to the requests with the virtual IP address and the virtual MAC address.

28. The switch device of claim 25, wherein the switch device is configured to advertise the virtual IP address to client systems.

29. The switch device of claim 25, wherein each real server in the real server group has a network interface card configured with the virtual IP address and a unique real server IP address.

30. The switch device of claim 25, wherein the server to which the identified table entry maps the computed hash value is a transparent proxy server of in transparent proxy server group.

31. The switch device of claim 25, wherein the server to which the identified table entry maps the computed hash value is an offloader proxy appliance in an offloader proxy appliance group.

32. The switch device of claim 25, wherein the server to which the identified table entry maps the computed hash value is a real server in a real server group.

33. The switch device of claim 25, wherein the switch device is capable of handling number of connections with client systems without limit because of memory requirements for storing client traffic sessions.

34. The switch device of claim 25, wherein each port of the switch device operates at a line rate of at least as fast as 10 Gb, and the switch device switches the packet received at the first port for forwarding sessionlessly to the identified server through the second port at the 10 Gb line rate per port.

35. The switch device of claim 25, wherein the switch device further comprises a management processor for checking a health status of each server in the server group.

36. The switch device of claim 35, wherein the management processor removes a given server from the packet forwarding table if the given server fails a health status check.

* * * * *